(12) United States Patent
Samuelsson

(10) Patent No.: US 11,232,900 B2
(45) Date of Patent: Jan. 25, 2022

(54) DEVICE FOR A WIRELESS POWER TRANSFER SYSTEM

(71) Applicant: Ningbo Geely Automobile Research & Development Co., Ltd., Ningbo (CN)

(72) Inventor: Gabriel Samuelsson, Alingsås (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 59 days.

(21) Appl. No.: 16/571,072

(22) Filed: Sep. 14, 2019

(65) Prior Publication Data

US 2020/0013549 A1 Jan. 9, 2020

Related U.S. Application Data

(63) Continuation of application No. PCT/CN2018/079786, filed on Mar. 21, 2018.

(30) Foreign Application Priority Data

Apr. 3, 2017 (EP) .................................... 17164550

(51) Int. Cl.
*H01F 38/14* (2006.01)
*H01F 27/02* (2006.01)
(Continued)

(52) U.S. Cl.
CPC ............. *H01F 38/14* (2013.01); *H01F 27/02* (2013.01); *H02J 7/025* (2013.01); *H02J 50/10* (2016.02);
(Continued)

(58) Field of Classification Search
CPC .......... H01F 38/14; H01F 27/02; H01F 27/36; H02J 50/10; H02J 50/20; H02J 50/80;
(Continued)

(56) References Cited

U.S. PATENT DOCUMENTS 9,912,172 B2 * 3/2018 Samuelsson .......... H01F 41/071
2014/0125140 A1 5/2014 Widmer
(Continued)

FOREIGN PATENT DOCUMENTS

CN 104768795 A 7/2015
CN 105164771 A 12/2015
(Continued)

OTHER PUBLICATIONS

International Search Report from corresponding International Patent Application No. PCT/CN2018/079786, dated Jun. 27, 2018, 1 page.
(Continued)

*Primary Examiner* — Toan T Vu
(74) *Attorney, Agent, or Firm* — Tucker Ellis LLP

(57) ABSTRACT

The invention relates to a device for a wireless power transfer system. The device comprises a housing and a coil arranged inside the housing. The coil comprises a first conductor wire forming a first sub coil having a plurality of windings and a second conductor wire forming a second sub coil having a plurality of windings. The housing comprises a first holder for accommodating and holding the first sub coil and a second holder for accommodating and holding the second sub coil. The first holder and the second holder are attached to each other such that the first sub coil and the second sub coil together form the coil being arranged between the first holder and the second holder.

20 Claims, 10 Drawing Sheets

(51) Int. Cl.
  *H02J 50/10* (2016.01)
  *H02J 7/02* (2016.01)
  *B60L 53/12* (2019.01)
  *B60K 6/28* (2007.10)

(52) U.S. Cl.
  CPC ............... *B60K 6/28* (2013.01); *B60L 53/12* (2019.02); *B60Y 2200/91* (2013.01); *B60Y 2200/92* (2013.01); *B60Y 2300/91* (2013.01)

(58) Field of Classification Search
  CPC .... H02J 50/50; H02J 7/025; H02J 7/02; H02J 5/00; B60L 53/12; B60K 6/28; B60Y 2200/91; B60Y 2200/92; B60Y 2300/91
  USPC .................. 307/9.1, 10.1, 66, 64, 82, 80, 43
  See application file for complete search history.

(56) References Cited

U.S. PATENT DOCUMENTS

| | | | | |
|---|---|---|---|---|
| 2014/0292468 A1* | 10/2014 | Motomiya | ........... | H05K 3/1291 336/200 |
| 2014/0327391 A1 | 11/2014 | Niederhauser et al. | | |
| 2014/0375260 A1 | 12/2014 | Janssen et al. | | |
| 2015/0255205 A1 | 9/2015 | Islinger | | |
| 2015/0364244 A1* | 12/2015 | Tsai | ........................ | H01F 27/36 336/200 |
| 2016/0204618 A1* | 7/2016 | Samuelsson | .......... | H01F 41/071 307/104 |
| 2016/0341573 A1 | 11/2016 | Widmer et al. | | |
| 2018/0254136 A1* | 9/2018 | Ueda | ........................ | H01F 27/10 |
| 2018/0269714 A1* | 9/2018 | Samuelsson | ........ | H01F 27/2871 |
| 2018/0358168 A1* | 12/2018 | Furiya | ..................... | H01F 27/24 |

FOREIGN PATENT DOCUMENTS

| | | | |
|---|---|---|---|
| CN | 205453309 U | 8/2016 | |
| CN | 106104726 A | 11/2016 | |
| CN | 106208408 A | 12/2016 | |
| JP | 2002305121 A | 10/2002 | |
| WO | 2013141718 A1 | 9/2013 | |
| WO | 2016114893 A1 | 7/2016 | |
| WO | WO-2016114893 A1 * | 7/2016 | ............ H02J 50/005 |
| WO | 2016186814 A1 | 11/2016 | |

OTHER PUBLICATIONS

Extended European Search Report from corresponding European Patent Application No. 17164550.0, dated Oct. 10, 2017, 11 pages.

* cited by examiner

DEVICE FOR A WIRELESS POWER TRANSFER SYSTEM

RELATED APPLICATION DATA

This application claims the benefit of International Patent Application No. PCT/CN2018/079786, filed Mar. 21, 2018, and European Patent Application No. 17164550.0, filed Apr. 3, 2017, the disclosure of which are incorporated herein by reference in their entireties.

TECHNICAL FIELD

The invention relates to a device for a wireless power transfer system and a method for producing a device for a wireless power transfer system. In addition, the invention relates to a vehicle comprising such a device.

BACKGROUND

Electric vehicles and plug in hybrid vehicles can be charged wirelessly through induction coils. Usually a first coil of a transmitter is arranged on the floor or the ground under the vehicle and a second coil of a receiver is arranged underneath the vehicle. There is a lot of different coil topologies that can be used for transferring power. In addition to transfer power efficiently, often small sized coils and coils enabling a large positioning tolerance between the transmitter coil and the receiver coil are preferred. This in turn makes the manufacturing and assembling of the coil into a casing relatively complicated. Since the power to be transferred by wireless charging is increasing there are more coils for wireless power transfer systems that are made by two sub coils arranged electrically connected in parallel. The use of such bifilar coils makes the production of wireless power transfer system even more complex.

SUMMARY

An object of the invention is to provide a device for a wireless power transfer system, which device can reduce assembly time.

The object is achieved by a device for a wireless power transfer system, wherein the device comprises a housing and a coil arranged inside the housing, and the coil comprises a first conductor wire forming a first sub coil having a plurality of windings and a second conductor wire forming a second sub coil having a plurality of windings, and the housing comprises a first holder for accommodating and holding the first sub coil and a second holder for accommodating and holding the second sub coil, and wherein the first holder and the second holder are attached to each other such that the first sub coil and the second sub coil together form the coil being arranged between the first holder and the second holder.

The invention is based on the insight that by providing a holder for each sub coil, each sub coil can be wound separately. Hereby the complex manufacturing of a bifilar coil where both conductor wires are wound at the same time to form the coil can be avoided. This in turn will reduce the time for assembling the coil. By the use of a first holder for the first sub coil and a second holder for the second sub coil, not only is the formation of the coil facilitated due to the fact that the respective sub coil can be wound separately and be kept in position during assembling, but the positions of the sub coils are secured also after assembling of the device.

The invention also enables assembling of more complex coils having twisted conductor wires which would not be possible to wound at the same time or at least would involve very high complexity and increased assembling time if wound at the same time.

Furthermore, by the use of the first holder and the second holder, the manufacturing of a compact device without undesired voidages or air gaps is facilitated.

According to one embodiment, a first portion of the first sub coil and a first portion of the second sub coil are arranged in one and the same plane, and preferably the coil has alternating windings of said first portion of the first sub coil and windings of said first portion of the second sub coil in the plane. Hereby, both a compact solution and the desired electromagnetic properties of the coil can be achieved.

According to a further embodiment, a second portion of the first sub coil and a second portion of the second sub coil are arranged on top of each other in a direction substantially perpendicular to the plane. Hereby, both a compact solution and the desired electromagnetic properties of the coil can be achieved.

According to a further embodiment, a normal vector to the plane is substantially parallel to a main connection direction for connecting the first holder and the second holder to each other. Hereby, the assembling is further facilitated since the first holder and the second holder can in a non-complicated manner be brought together and be connected to each other while the coil is formed by the first sub coil and the second sub coil.

According to a further embodiment, the first holder has a first side and a second side opposite to the first side, wherein the first sub coil is arranged at the first side of the first holder, and the first side of the first holder has a first surface covering the first sub coil and separating the first sub coil from the second side of the first holder. Hereby, the first sub coil can be insulated relative to other parts of the device, such as for example any ferrite plates included, or the surrounding to the device.

According to a further embodiment, the second holder has a first side and a second side opposite to the first side, wherein the second sub coil is arranged at the first side of the second holder, and the first side of the second holder has a first surface covering the second sub coil and separating the second sub coil from the second side of the second holder. Hereby, the second sub coil can be insulated relative to other parts of the device or the surrounding of the device. For example, the surface of the second side of the second holder may constitute an outer surface of the device.

According to a further embodiment, the first holder is plate-shaped and has a main extension in a first plane, and the second holder is plate-shaped and has a main extension in a second plane, wherein the first holder and the second holder are connected to each other such that the first plane and the second plane being arranged substantially in parallel to each other. Hereby, a compact device with a relatively low height can be achieved.

According to a further embodiment, the first holder has guiding walls for positioning of the first sub coil and separating windings of the first sub coil relative to each other. Hereby, an efficient assembling and reliable positioning of the first sub coil can be achieved.

According to a further embodiment, the second holder has guiding walls for positioning of the second sub coil and separating windings of the second sub coil relative to each other. Hereby, an efficient assembling and reliable positioning of the second sub coil can be achieved.

According to a further embodiment, the first surface of the first side of the first holder has a recess for receiving at least a major portion of the first sub coil. Hereby, both the compactness of the device as well as the positioning of the first sub coil can be improved.

According to a further embodiment, for the major portion of the first sub coil, an outer surface of the first sub coil and the first surface of the first holder are flush with each other when the first sub coil being arranged in the recess. Hereby, any voidage or gap inside the device can be reduced or avoided.

According to a further embodiment, the first surface of the first side of the second holder has a recess for receiving at least a major portion of the second sub coil. Hereby, both the compactness of the device as well as the positioning of the second sub coil can be improved.

According to a further embodiment, for the major portion of the second sub coil, an outer surface of the second sub coil and the first surface of the second holder are flush with each other when the second sub coil being arranged in the recess. Hereby, any voidage or gap inside the device can be reduced or avoided.

According to a further embodiment, the device comprises at least one ferrite plate arranged at the second side of the first holder and the first holder is arranged to insulate the first sub coil and the ferrite plate relative to each other. Hereby, the electromagnetic properties of the device can be achieved at the same time as no additional insulation is required for insulating the first sub coil (and the second sub coil) relative to the ferrite plate.

According to a further embodiment, a second surface of the second side of the first holder has a recess for accommodating said at least one ferrite plate. Hereby, a compact device can be obtained and the ferrite plate can be positioned relative to the first sub coil and/or the second sub coil for improving the electromagnetic properties of the device.

According to a further embodiment, the first sub coil arranged at the first side of the first holder has two end portions of the first conductor wire which are arranged on the second side of the first holder, wherein the two end portions of the first conductor wire extend from the first side of the first holder via through holes of the first holder to the second side of the first holder. Hereby, a connection position for the first sub coil can be achieved which provides a convenient electric connection of the device.

According to a further embodiment, the second sub coil has two end portions of the second conductor wire which are arranged on the second side of the first holder, wherein the two end portions of the second conductor wire extend from the first side of the first holder via through holes of the first holder to the second side of the first holder. Hereby, a connection position for the second sub coil can be achieved which provides a convenient electric connection of the device.

A further aspect of the invention relates to a method. The first object is achieved by a method for producing a device for a wireless power transfer system, where the device comprises a coil. The method comprises the steps of winding a first conductor wire into a first holder for forming a first sub coil, winding a second conductor wire into a second holder for forming a second sub coil, and attaching the first holder and the second holder to each other such that the first sub coil and the second sub coil together form the coil between the first holder and the second holder.

The advantages of the method are substantially the same as described for the device hereinabove.

A further aspect of the invention relates to a vehicle comprising a device according to the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
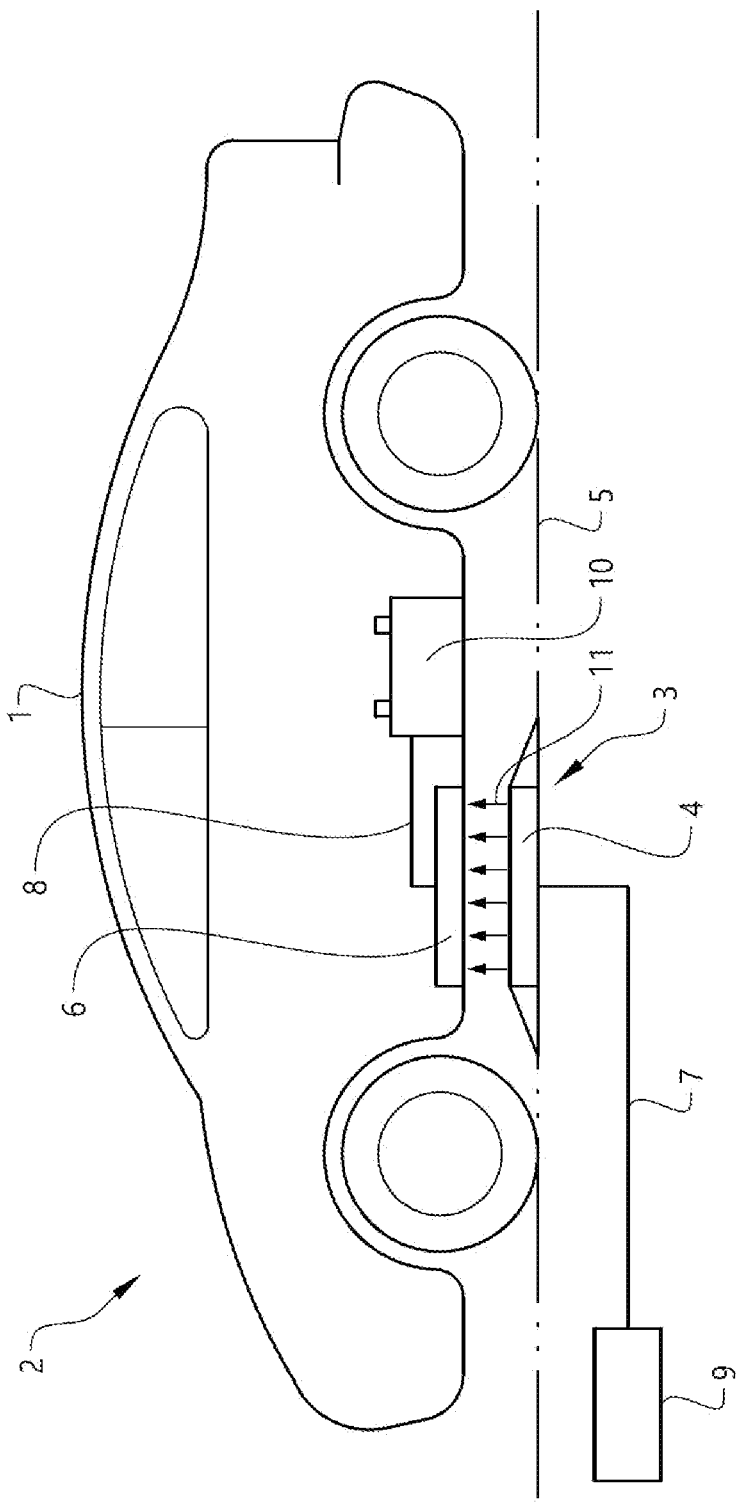
FIG. 1 is a side view of a vehicle and a wireless power transfer system of a charging station.

In FIG. 1 a vehicle 1 is positioned at a charging station 2 where a wireless power transfer system 3 is used. The wireless power transfer system 3 includes a transmitter 4 arranged on the floor 5 and a receiver 6 arranged in the vehicle 1. Such a transmitter can be arranged on or in the floor or the ground. Further, the receiver 6 is preferably arranged on the underside of the vehicle 1. The transmitter 4 has a primary coil for generating an electromagnetic field and the receiver 6 has a secondary coil for interacting with the generated electromagnetic field for achieving power transfer from the primary coil to the secondary coil by electromagnetic induction. A power input 7 to the transmitter 4 can be wirelessly transferred from the transmitter 4 to the receiver 6 to achieve a power output 8 from the receiver 6. The wireless transfer of energy is schematically illustrated with arrows 11.

In the illustrated example, the transmitter 4 is powered by a power source 9 electrically connected to the transmitter 4. The power source and the power outlet thereof can be arranged at any suitable position, for example the power source can be arranged on a wall. The receiver 6 can be connected to any arrangement for storing and/or consumption of the energy transferred. In the illustrated example, the receiver 6 is electrically 10 connected to a battery 10 arranged on the vehicle 1 for charging the battery 10. The vehicle 1 is positioned for arranging the transmitter 4 and the receiver 6 relative to each other such that energy can be transferred from the transmitter 4 to the receiver 6. The transmitter 4 and the receiver 6 are separated by a predetermined distance in the vertical direction. Further, the transmitter 4 and the receiver 6 are at least partly overlapping each 15 other when looked at in the vertical direction.

The device and the method according to the invention can be applied for providing a transmitter and/or a receiver of a wireless power transfer system. For example, such a wireless power transfer system device according to the invention can be used as a component of a receiver to be arranged on a vehicle as illustrated in FIG. 1. It should be stressed that when the device is used as a receiver coil or transmitter coil, the complete receiver or transmitter may include other components as well, such as electric circuits and components. Further, the invention is not in any way limited to the car application. The device can be used in any vehicle or machine application, such as for example cars, busses, trucks, industrial trucks and automated guided vehicles, construction equipment and work machines, and trains.

Figure 2A:
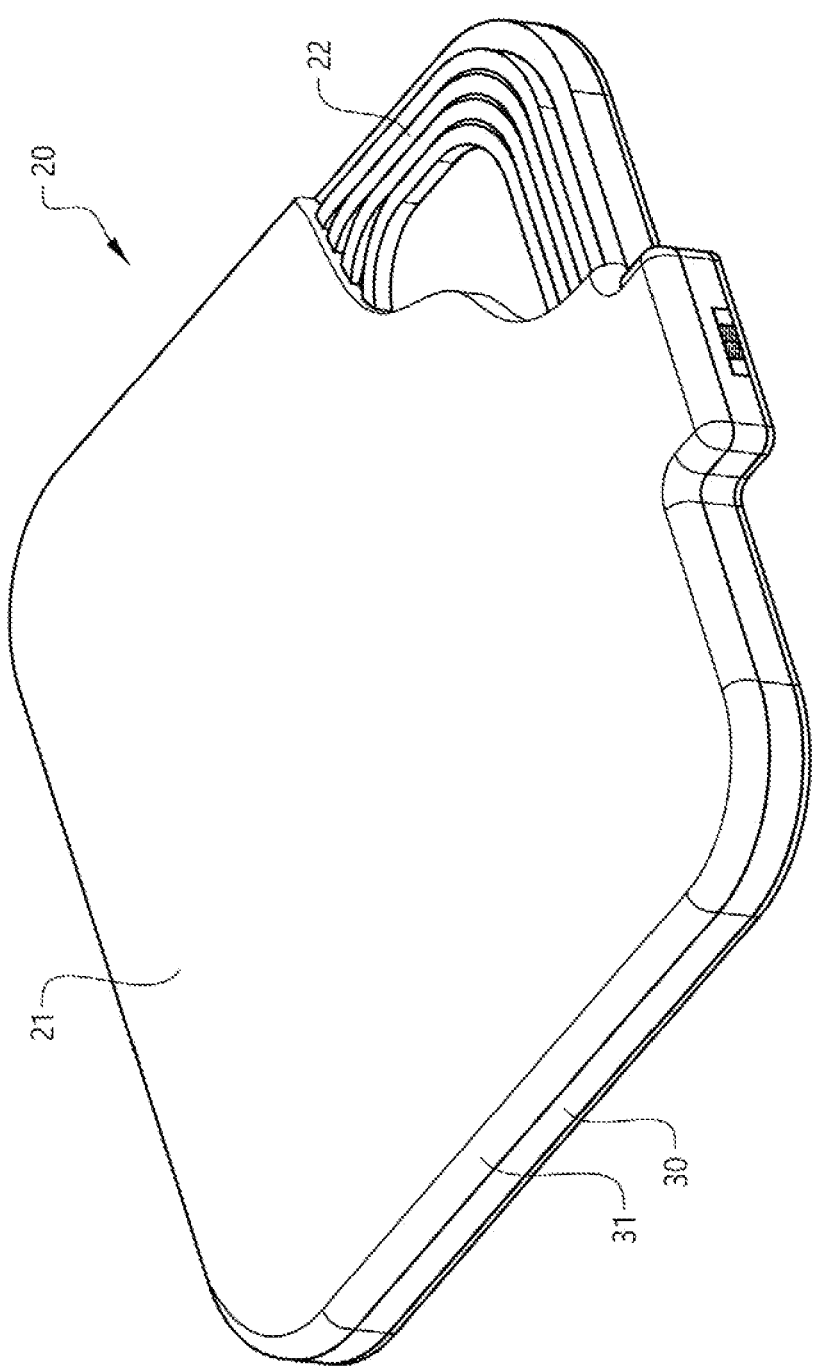
FIG. 2A is a partly cut perspective view of one embodiment of a device according to the invention.
Figure 2B:
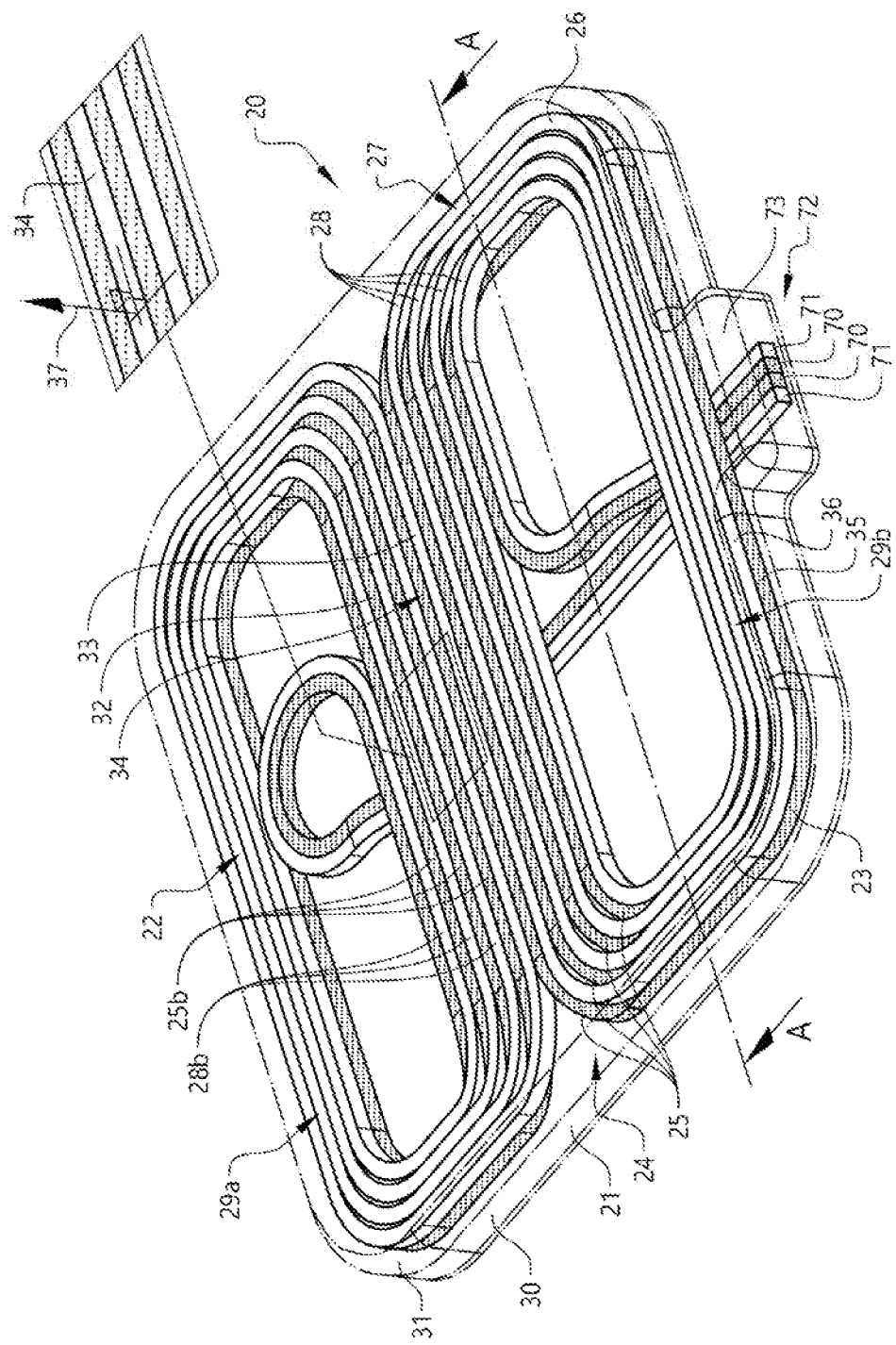
FIG. 2B is a perspective view of the device in FIG. 2A depicted transparent for the purpose of illustration.

In FIGS. 2A and 2B, one embodiment of a device 20 for a wireless power transfer system is illustrated. The device 20 comprises a housing 21 and a coil 22 arranged inside the housing 21. The coil 22 comprises a first conductor wire 23 forming a first sub coil 24 having a plurality of windings 25 and a second conductor wire 26 forming a second sub coil 27 having a plurality of windings 28. FIG. 2A is a partly cut perspective view where a part of the housing 21 has been removed for illustrating the coil 22. For the same reason, the housing 21 of FIG. 2B is depicted as transparent to show the coil 22 arranged inside the housing 21. Further, only for improving the illustration, the first conductor wire 23 is grey and the second conductor wire 27 is white.

The coil 22 is formed by at least said two sub coils 24, 27. The sub coils 24, 27 are preferably arranged adjacent to each other. Further, in the example embodiment illustrated in FIG. 2B, the first sub coil and the second sub coil are arranged to be electrically connected in parallel.

Although in the example embodiments illustrated herein, the coil 22 is formed by the first sub coil 24 and the second sub coil 27, i.e. by two sub coils, it should be stressed that three or more sub coils can also be used in other applications.

In the example embodiment illustrated in FIG. 2B, the windings 25 of the first sub coil 24 are arranged for forming a substantially flat first sub coil 24, and the windings 28 of the second sub coil 27 are arranged for forming a substantially flat second sub coil 27. Such a flat sub coil has a relatively large extension in a main plane in relation to the thickness of the sub coil. By arranging these sub coils on top of each other, the coil 22 may have a thickness corresponding to the sum of the thickness of the first sub coil and the thickness of the second sub coil.

The number of windings 25 of the first sub coil 24 and the number of windings 28 of the second sub coil 27 can be varied depending on the application and the dimension of the conductor wire used. For example, the number of windings can be in the interval 3-20, and often preferably in the interval 4-12, for each of the first sub coil and the second sub coil. The number of windings is preferably approximately the same for the first sub coil as the second sub coil. The conductor wire can be wound into different shapes, for example, each sub coil can have a plurality of windings of a first loop 29a and a plurality of windings of a second loop 29b. Although each sub coil of the device illustrated in FIG. 2B, is wound to form a so called "double D"-configuration having a first "D-loop" 29a and a second "D-loop" 29b, also other coil configurations can be used.

The path of the first conductor wire 23 and the path of the second conductor wire 26 are preferably similar to each other. In other words; the first sub coil 24 and the second sub coil 27 have suitably similar configurations for giving the coil 22 the desired shape and/or electromagnetic properties.

The conductor wire of the sub coils 24, 27 can be made from any suitable conducting material, preferably metal, such as for example copper. The conductor wire should have a cross section area adapted to the electric current to be transferred. For many applications where the device is used for a wireless power transfer system in a vehicle application, the cross-section area of the wire can be in the interval 4-100 mm2, and often in the interval 8-80 mm2. The cross section of the conductor wire is preferably square, such as four-square or rectangular, even if a conductor wire having another cross section, for example a circle cross section, also can be used. The cross-section dimensions of the conductor wire can be in the interval 2-10 mm, for instance.

The housing 21 comprises a first holder 30 for accommodating and holding the first sub coil 24 and a second holder 31 for accommodating and holding the second sub coil 27. The first holder is suitably configured to hold the first sub coil in a predetermined winding pattern. The second holder is suitably configured to hold the second sub coil in a predetermined winding pattern. As illustrated in FIGS. 2A and 2B, the first holder 30 and the second holder 31 are attached to each other such that the first sub coil 24 and the second sub coil 27 together form the coil 22 being arranged between the first holder 30 and the second holder 31. The first holder and the second holder can be arranged on top of each other and be mechanically connected to each other. The first holder 30 and the second holder 31 are further illustrated in FIGS. 3A and 3B, where the device has been divided into the first holder 30 with the first sub coil 24 and the second holder 31 with the second sub coil 27 for illustration purposes.

The housing 21 is suitably made from a non-conducting material, such as for example a plastic material. The first holder and the second holder can be mechanically connected to each other by means of any suitable attaching mechanism, such as a bolted joint, a snap connection, a quick release connection, glue or similar.

A first portion 32 of the first sub coil 24 and a first portion 33 of the second sub coil 27 can be arranged in one and the same plane 34. This is illustrated in FIG. 2B, where the coil 22 has alternating windings 25b of said first portion 32 of the first sub coil 24 and windings 28b of said first portion 33 of the second sub coil 27 in the plane 34. In other words; for a plurality of windings 25b, 28b of the first sub coil 24 and the second sub coil 27, each winding of said portion of the first sub coil 24 is followed by a winding of said portion of the second sub coil 27, and each winding of said portion of the second sub coil 27 is followed by a winding of said portion of the first sub coil 24.

As also illustrated in FIG. 2B, a second portion 35 of the first sub coil 24 and a second portion 36 of the second sub coil 27 are suitably arranged on top of each other in a direction substantially perpendicular to the plane 34. As already mentioned, the first holder 30 and the second holder 31 are connected to each other to obtain the device 20. A normal vector 37 to the plane 34 is preferably parallel to a main connection direction for connecting the first holder 30 and the second holder 31 to each other.

The first portion 32 of the of the first sub coil 24 and the first portion 33 of the second sub coil 27 that are arranged in one and the same plane 34 can be positioned in an inner central part of the coil 22, whereas the second portion 35 of the first sub coil 24 and the second portion 36 of the second sub coil 27 that are arranged on top of each other can be positioned in the outer parts of the coil, along a perimeter of the device for instance.

Figure 3A:
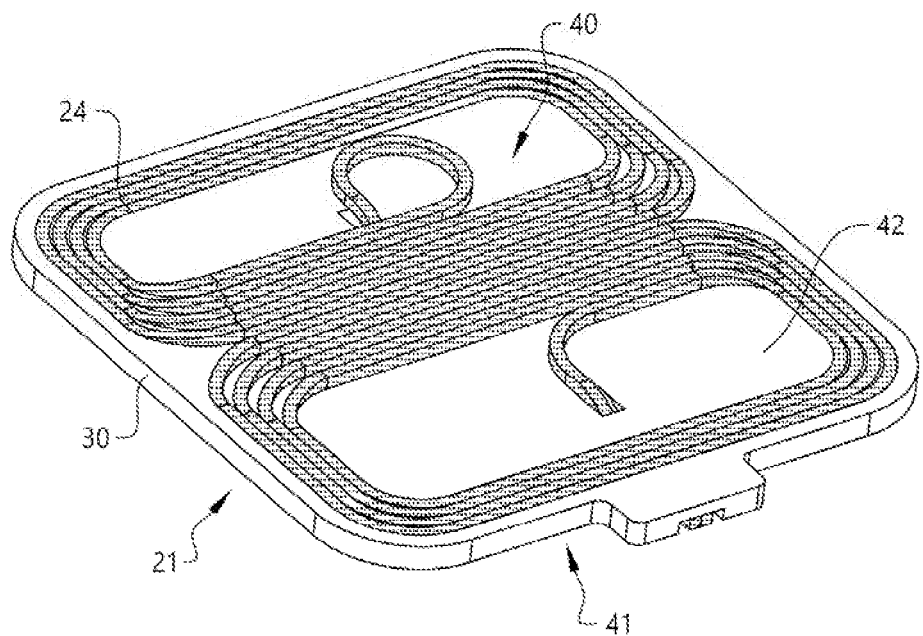
FIG. 3A is a perspective view of one embodiment of a first holder with a first sub coil.
Figure 3B:
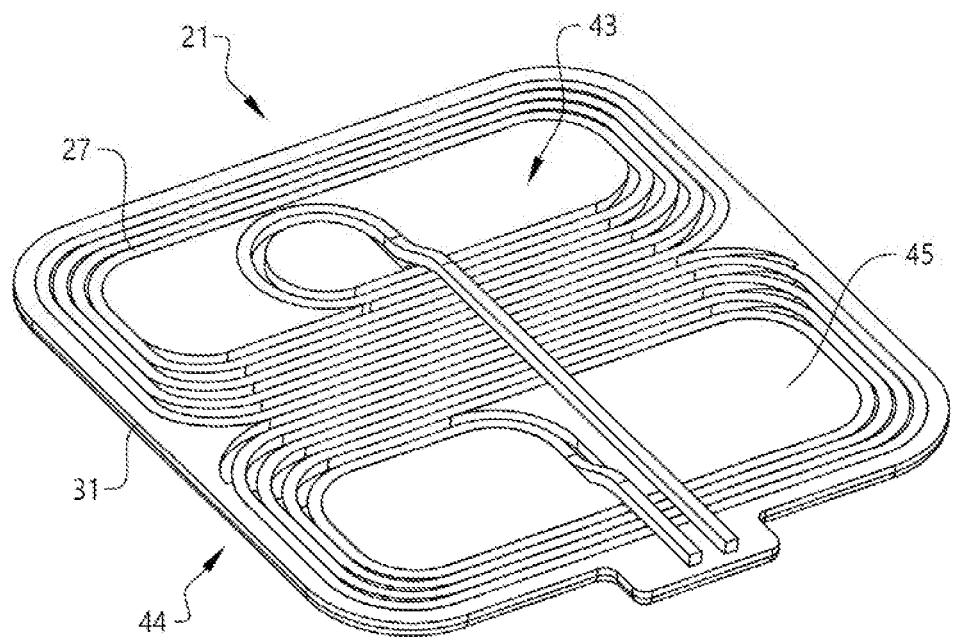
FIG. 3B is a perspective view of one embodiment of a second holder with a second sub coil.

With reference to FIGS. 3A and 3B, the first holder 30 has a first side 40 and a second side 41 opposite to the first side 40, and the first sub coil 24 is arranged at the first side 40 of the first holder 30. The first side 40 of the first holder 30 has a first surface 42 that covers the first sub coil 24 and separates the first sub coil 24 from the second side 41 of the first holder 30.

The second holder 31 has a first side 43 and a second side 44 opposite to the first side 43, and the second sub coil 27 is arranged at the first side 43 of the second holder 31. The first side 43 of the second holder 31 has a first surface 45 that covers the second sub coil 27 and separates the second sub coil 27 from the second side 44 of the second holder 31. A second surface 68 of the second side 44 of the second holder 31 may form an outer surface of the housing. See also FIG. 5.

The first holder 30 is preferably plate-shaped and has a main extension in a first plane, and the second holder 31 is preferably plate-shaped and has a main extension in a second plane. The first holder 30 and the second holder 31 are connected to each other such that the first plane and the second plane are arranged substantially in parallel to each other. Further, the normal vectors to these planes are preferably in parallel to the main connection direction for connecting the first holder 30 and the second holder 31 to each other.

Figure 3C:
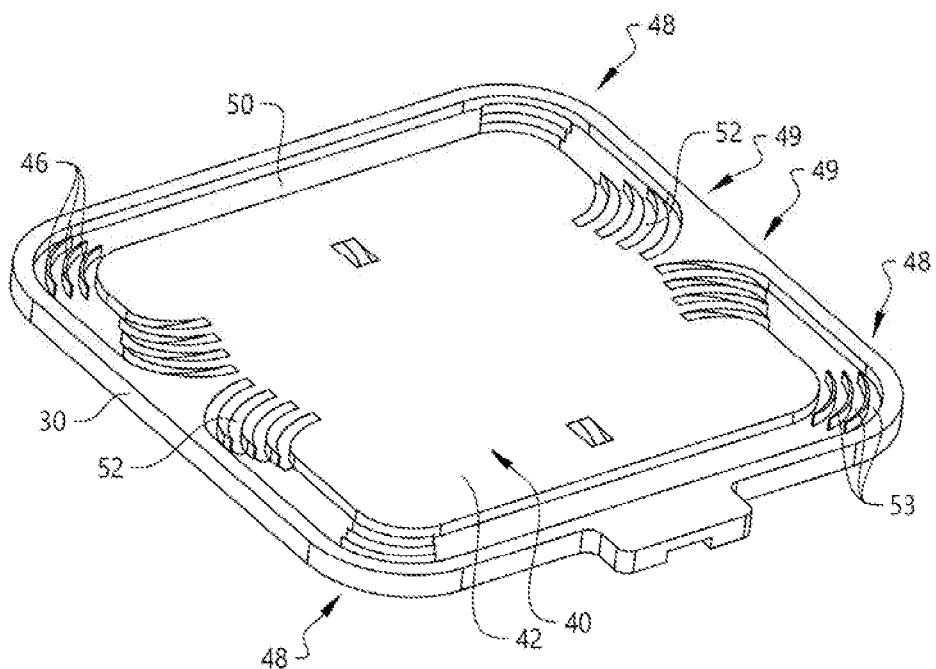
FIG. 3C is a perspective view of the first holder illustrated in FIG. 3A without the first sub coil.
Figure 3D:
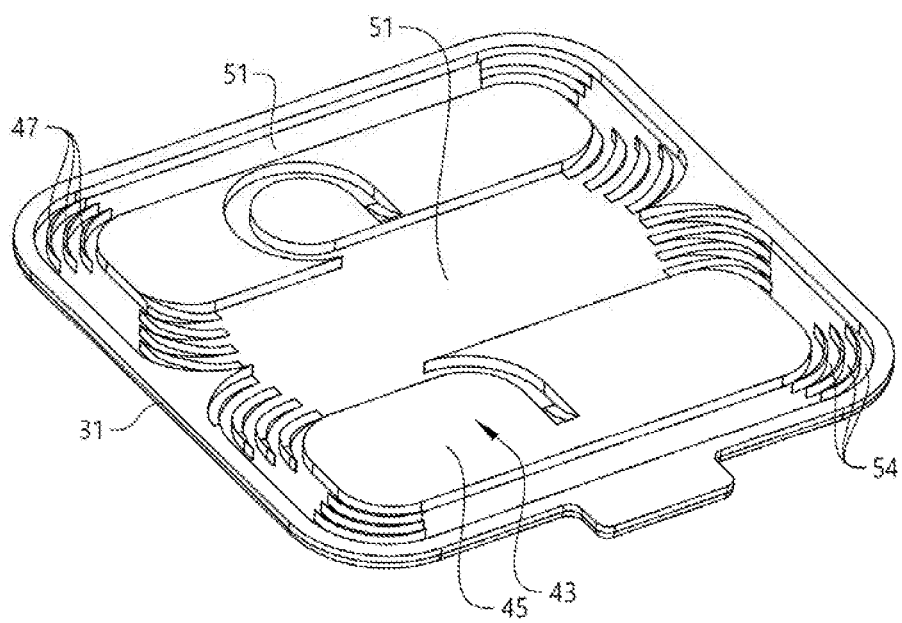
FIG. 3D is a perspective view of the second holder illustrated in FIG. 3B without the second sub coil.

The first holder 30 and the second holder 31 are also illustrated in FIGS. 3C and 3D (without respective sub coil). The first holder 30 has guiding walls 46 or ribs (hereinafter called first guiding walls) for positioning of the first sub coil 24 and separating windings of the first sub coil 24 relative to each other. The second holder 31 has guiding walls 47 or ribs (hereinafter called second guiding walls) for positioning of the second sub coil 27 and separating windings of the second sub coil 27 relative to each other. These first and second guiding walls 46, 47 can suitably be arranged where the extension direction of the respective conductor wire is changed. In other words; the first and second guiding walls can be arranged for guiding the respective conductor wire along at least a part of each of the windings or turns. In the example embodiment illustrated in FIGS. 3C and 3D, the guiding walls are arranged at the corners 48 of the housing and in the zones 49 where the coil 22 transitions between a state where the sub coils are arranged on top of each other and a state where the sub coils are arranged in the same plane. The first and second guiding walls are preferably curved for facilitating the positioning of the windings of the respective sub coil such that the extension direction of the windings can be changed and the windings can be kept in the desired position. The first and second guiding walls can have a height corresponding to the thickness (height) of the conductor wire. Further, the first and second guiding walls can be relatively thin for avoiding unnecessary occupation of space and allow the windings to be arranged relatively close to each other.

The first surface 42 of the first side 40 of the first holder 30 has a recess 50 for receiving at least a major portion of the first sub coil 24. In the example embodiment illustrated in FIG. 3C, the shape and measures of the recess correspond to the space occupied by the windings of the first sub coil. The width of the recess corresponds to the thickness of the first conductor wire and the number of windings. The depth of the recess corresponds to the thickness (height) of the first conductor wire. Preferably, substantially the entire space of the recess is filled by the first sub coil. The recess 50 is arranged in an area where the first sub coil and the second sub coil are to be arranged on top of each other. Close to the central part of the housing where the coil will transition between a state where the sub coils are arranged on top of each other and a state where the sub coils are arranged in the same plane, the recess is smoothly ended by a ramp portion 52 extending from the bottom of the recess to the upper level of the first surface 42.

As is illustrated in FIG. 3C, the first guiding walls 46 and the recess 50 can be combined. Thus, the first guiding walls 46 are arranged in the recess 50, dividing the recess 50 into a plurality of channels 53 for positioning adjacent windings of the first sub coil separated from each other in said channels. Furthermore, for the major portion of the first sub coil 24, an upper outer surface of the first sub coil 24 and the first surface 42 of the first holder 30 are preferably arranged flush with each other when the first sub coil 24 being arranged in the recess 50. See also FIG. 3A.

The first surface 45 of the first side 43 of the second holder 31 has a recess 51 for receiving at least a major portion of the second sub coil 27. In the example embodiment illustrated in FIG. 3D, the shape and measures of the recess 51 correspond to the space occupied by the windings of the second sub coil. The width of the recess corresponds to the thickness of the second conductor wire and the number of windings. The depth of the recess corresponds to the thickness (height) of the second conductor wire. Preferably, substantially the entire space of the recess 51 is filled by the second sub coil or by the second sub coil and the first sub coil. The recess 51 is arranged in an area where the first sub coil and the second sub coil are to be arranged on top of each other. The recess 51 also extends in the central part of the housing. In the central part of the housing, where the sub coils are to be arranged in the same plane, the recess 51 is widened for receiving the first sub coil as well.

As is illustrated in FIG. 3D, the second guiding walls 47 and the recess 51 can be combined. Thus, the second guiding walls 47 are arranged in the recess 51, dividing the recess into a plurality of channels 54 for positioning adjacent windings of the second sub coil separated from each other in said channels. Furthermore, for at least the major portion of the second sub coil 27, an upper outer surface of the second sub coil and the first surface 45 of the second holder 31 are preferably arranged flush with each other when the second sub coil is arranged in the recess. See also FIG. 3B.

Figure 2C:
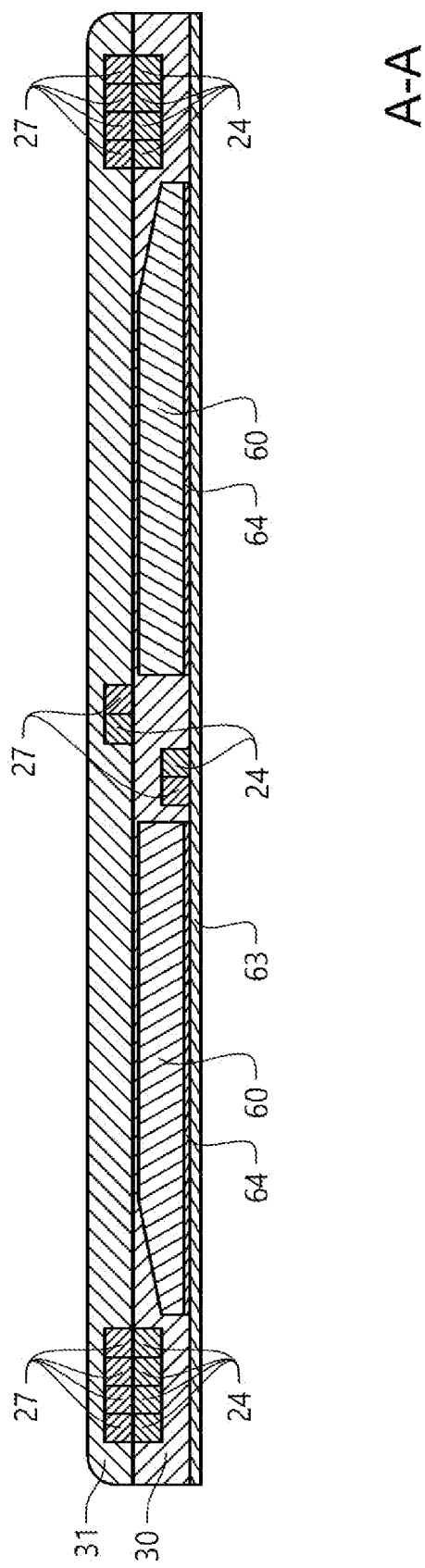
FIG. 2C is a cross section view along A-A in FIG. 2B.

FIG. 2C shows a cross section view of the device 20 illustrated in FIG. 2B. The conductor wires 23, 26 are supported by the first holder 30 and the second holder 31. By the use of the first holder and the second holder, the device can be made compact without any undesired spatial gaps that could have a negative impact on the conductor wire position.

Close to the central part of the housing where the coil will transition between a state where the sub coils are arranged on top of each other and a state where the sub coils are arranged in the same plane, the second guiding walls 47 have a smoothly increased thickness in the direction towards the central part. The end portions of these second guiding walls 47 have a thickness that corresponds to the thickness (width) of the first conductor wire of the first sub coil. This gives an increased distance between the windings of the second sub coil that will enable the windings of the first sub coil to be arranged between the windings of the second sub coil.

In a corresponding way, close to the central part of the housing where the coil will transition between a state where the sub coils are arranged on top of each other and a state where the sub coils are arranged in the same plane, the first guiding walls 46 have a smoothly increased thickness in the direction towards the central part. The end portions of these first guiding walls 46 have a thickness that corresponds to the thickness (width) of the second conductor wire of the second sub coil. This gives an increased distance between the windings of the first sub coil that will enable the windings of the second sub coil to be arranged between the windings of the first sub coil.

Figure 4:
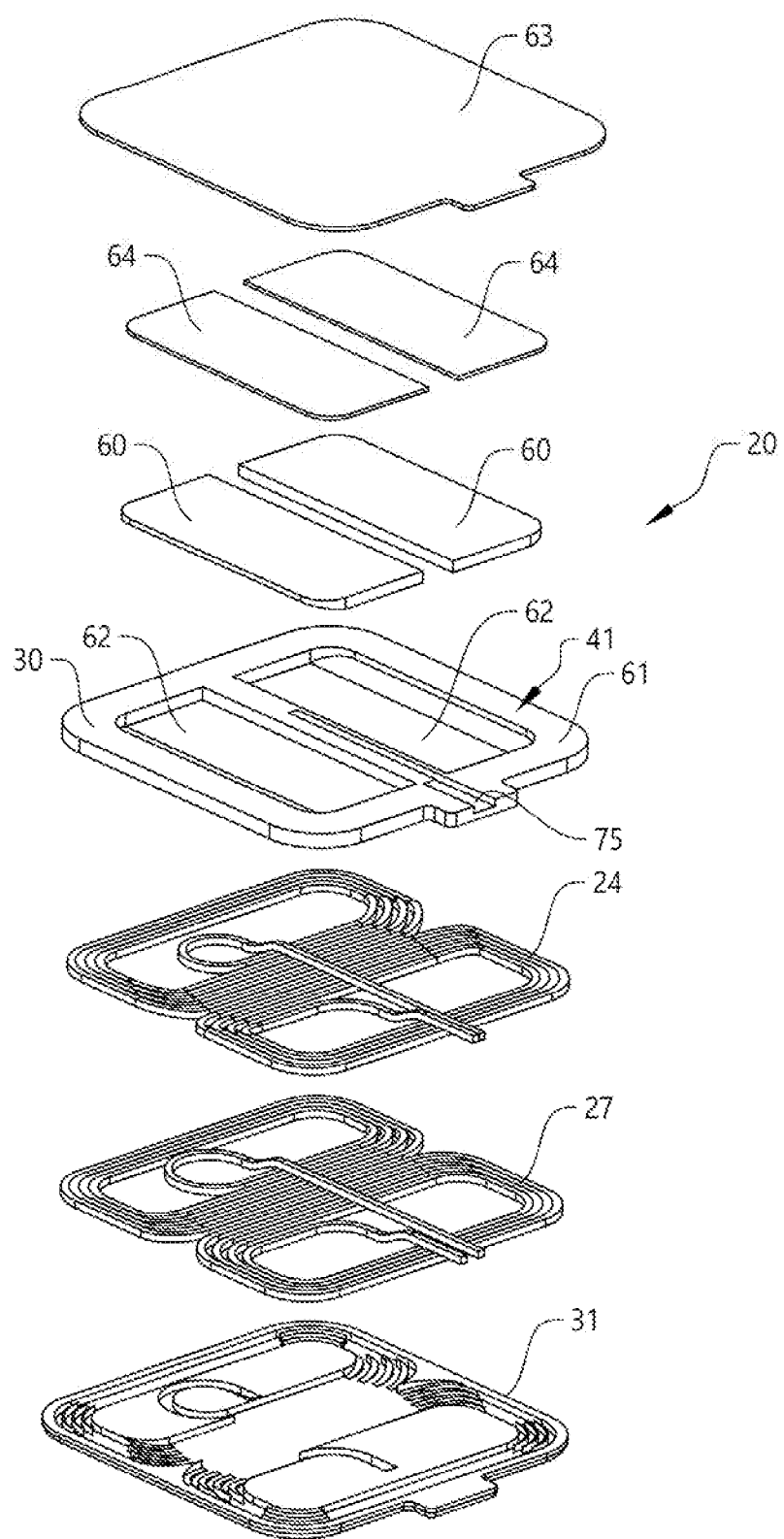
FIG. 4 is an exploded view of one embodiment of a device according to the invention.
Figure 5:
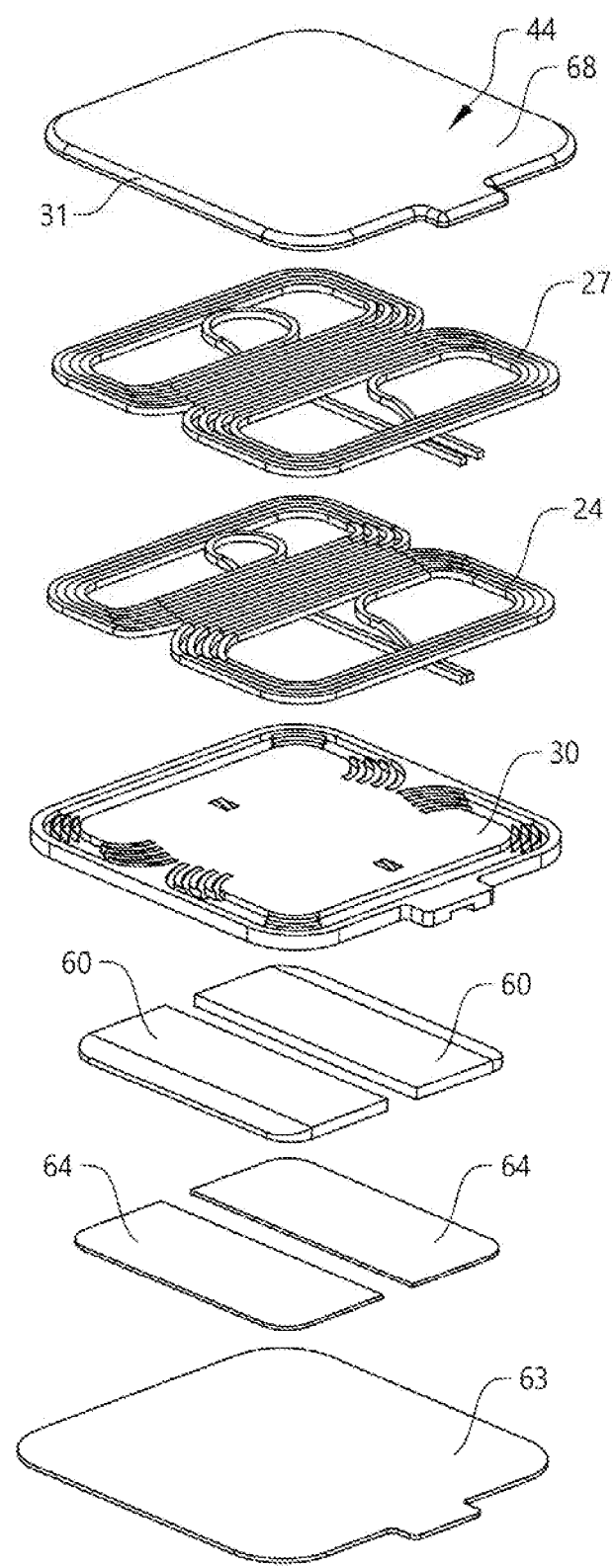
FIG. 5 is an exploded view corresponding to FIG. 4, where the device has been turned upside down as compared to FIG. 4, FIGS. 6A and 6B are perspective views showing end portions of the sub coils arranged at an electric connection position.

FIGS. 4 and 5 illustrate the device 20 in two exploded views. FIG. 4 shows the device 20 with the first holder 30 above the second holder 31, whereas in FIG. 5 the device 20 is turned upside down in comparison to FIG. 4, i.e. with the second holder 31 above the first holder 30.

As can be seen from FIG. 4 showing the first holder 30 from the second side 41, the device 20 comprises at least one ferrite plate 60 arranged at the second side 41 of the first holder 30. The number of ferrite plates can be varied and such a ferrite plate may in turn be divided into a plurality of sub ferrite plates and/or be designed in different shapes. The first holder 30 is arranged to insulate the first sub coil 24 and said at least one ferrite plate 60 relative to each other. A second surface 61 of the second side 41 of the first holder 30 has a recess 62 for accommodating said at least one ferrite plate 60. Optionally, the ferrite plate can be attached to the first holder by means of glue or double-sided tape or similar.

The device 20 further comprises a cover plate 63 arranged on the second surface 61 of the first holder 30 for covering said at least one ferrite plate 60. The device 20 can further comprise at least one insulation plate 64 arranged between said at least one ferrite plate 60 and the cover plate 63 for insulating said at least one ferrite plate 60 and the cover plate 63 relative to each other. The depth of the recess 62 suitably corresponds to the total thickness of the ferrite plate and the insulation plate. In the example embodiment illustrated in FIG. 4, two main ferrite plates 60 each having an insulating plate 64 are included.

The electric connection of the coil 22 can be designed in different ways. In the example embodiment illustrated in FIGS. 2A and 2B, the end portions 70, 71 of the sub coils 24, 27 are arranged at a common electric connection position 72. This electric connection position can be situated at one end of the housing as illustrated. Further the housing may have a protruding portion 73 where the end portions of the sub coils are arranged.

Figure 6A:
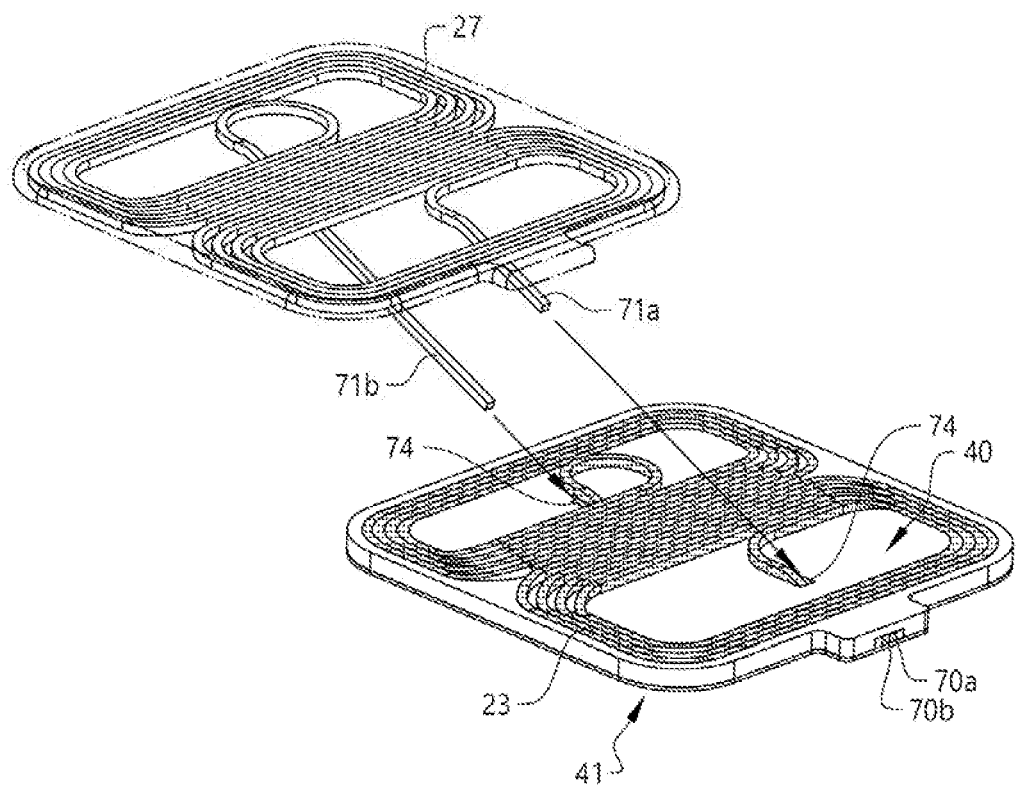
Figure 6B:
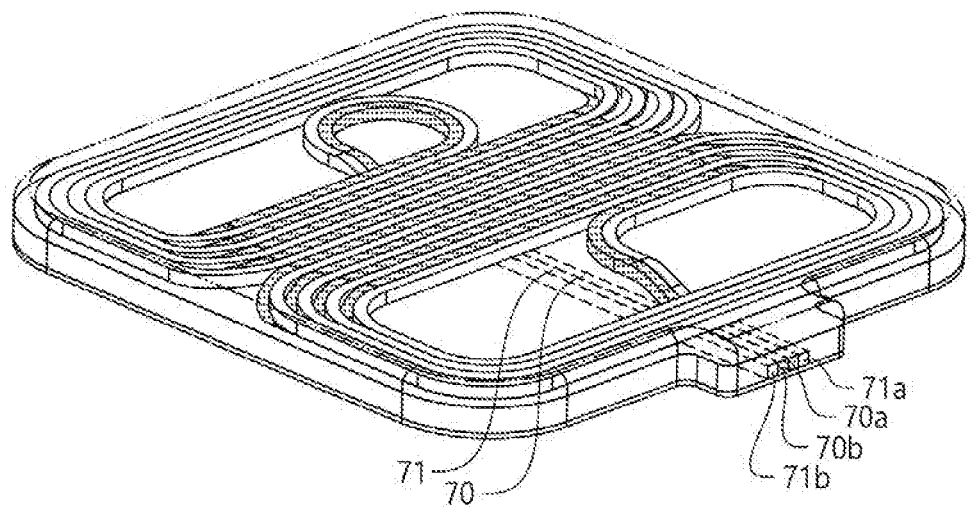

FIGS. 6A and 6B show how the end portions 70, 71 of the sub coils can be arranged at the electric connection position 72. The upper second holder is depicted as transparent for illustration purposes. The first sub coil 24 arranged at the first side 40 of the first holder 30 has two end portions 70*a*, 70*b* of the first conductor wire 23 which are arranged on the second side 41 of the first holder 30. The two end portions 70*a*, 70*b* of the first conductor wire 23 extend from the first side 40 of the first holder 30 via through holes 74 of the first holder 30 to the second side 41 of the first holder. Further, the second sub coil 27 has two end portions 71*a*, 71*b* of the second conductor wire 26 which also are arranged on the second side 41 of the first holder 30. The two end portions 71*a*, 71*b* of the second conductor wire 26 extend from the first side 40 of the first holder 30 via through holes 74 of the first holder 30 to the second side 41 of the first holder. The end portions 70, 71 of the sub coils then extend along the second side 41 of the first holder 30 to the electric connection position 72.

The sub coils can be terminated at an electric contact unit at the electric connection position. The sub coils can be connected to the current system by electric cables extending from the electric connection position to a control unit, for instance. In an alternative embodiment, the conductor wires are not terminated at any electric connection position of the device, but continue from the device to a control unit that can be arranged at distance from the device.

In a further alternative embodiment, each end portion of each sub coil is terminated at an electric contact unit arranged on the same side of the holder as the sub coil is arranged. The electric contact units are in turn connected to a control unit that can be integrated in the housing of the device.

When the embodiment described with reference to FIGS. 4 and 5 is applied, i.e. the second surface 61 of the second side 41 of the first holder 30 has two recesses for accommodating two ferrite plates, the end portions 70, 71 of the sub coils 24, 27 can extend from the through holes 74, between the ferrite plates and along the second surface of the second side of the first holder to the electric connection position 72. Further, the second surface can also have an additional recess 75 for receiving the end portions of the sub coils. See FIG. 4. The end portions of the sub coils can also be covered with any insulating sheath for insulating the ferrite plates and the end portions relative to each other.

Figure 7A:
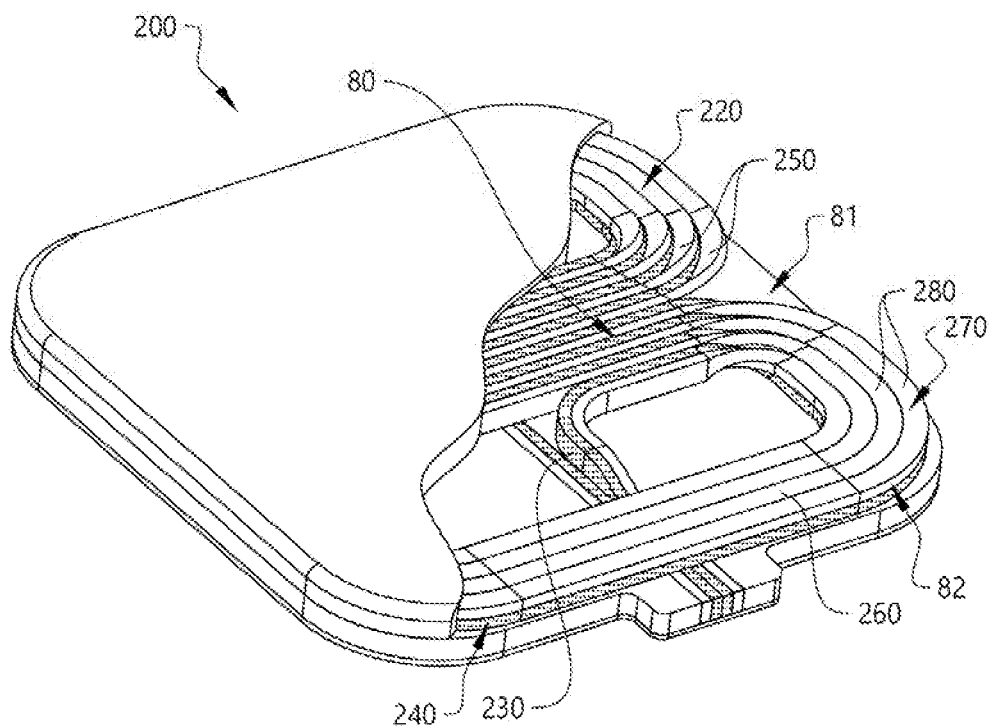
FIG. 7A is a partly perspective view of a further embodiment of a device according to the invention.

In a further embodiment of the device 200 illustrated in FIG. 7A, for a plurality of windings 250 of the first sub coil 240, the first conductor wire 230 is twisted. By twisted is meant rotated around its own longitudinal axis. Hereby each of these windings has a first portion 80 on a first side of a twisting zone 81 and a second portion 82 on a second side of a twisting zone 81. The first conductor wire 230 can be twisted 90 degrees around its longitudinal axis. This is preferably applied when the first conductor wire 230 has a rectangular cross section with the sides "a" and "b", where a<b, and preferably b=2a.

Figure 7B:
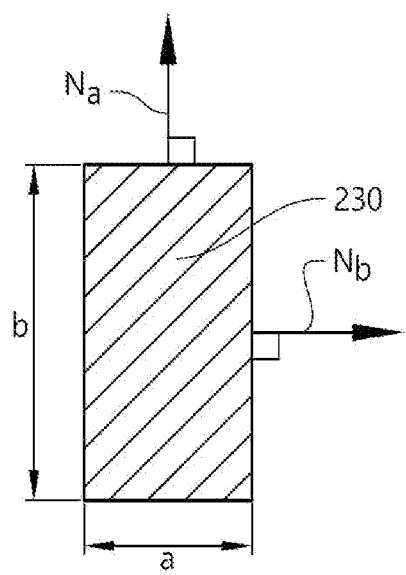
FIG. 7B is an enlarged cross section view of a conductor wire.

The first conductor wire can have a first normal vector Na to a first surface of the first conductor wire, where the first surface is defined by the side "a" and the longitudinal extension of the first conductor wire, and a second normal vector Nb to a second surface of the first conductor wire, where the second surface is defined by the side "b" and the longitudinal extension of the first conductor wire. See also FIG. 7B that is an enlarged cross section view of a conductor wire.

Thus, when the first conductor wire is twisted 90 degrees, the first normal vector Na for the first portion 80 of the winding and the second normal vector Nb for the second portion 82 of the winding are directed substantially in the same direction. In the same way as described with reference to the first conductor wire 230, a twisted second conductor wire 260 can advantageously be applied for a plurality of windings 280 of the second sub coil 270, as also illustrated in FIG. 7A.

For example, for a first portion 80 of the coil 220 where a first portion of the first sub coil and a first portion of the second sub coil are arranged in one and the same plane, both conductor wires can be positioned with the first normal vector in parallel with the normal vector to the plane. In the same way as described herein with reference to the embodiment illustrated in FIG. 2B, for the first portion of the coil, the coil has suitably alternating windings of said first portion of the first sub coil and windings of said first portion of the second sub coil in the plane. Further, for a second portion 82 of the coil where a second portion of the first sub coil and a second portion of the second sub coil are arranged on top of each other, in a direction substantially perpendicular to the plane, both conductor wires can be positioned with the second normal vector in parallel with the normal vector to the plane. If for example, as described hereinabove, each conductor wire has cross section measures "a" and "b", where b=2a, then the thickness of the coil will be approximately the same for the first portion 80 and the second portion 82 of the coil.

One embodiment of the method according to the invention will be described hereinafter. For the components involved in the method, reference is made to the figures mentioned hereinabove when describing the device. This method can be used for producing a device for a wireless power transfer system. For example, the method can be used for producing the receiver and/or the transmitter of such a system. Such a device comprises a coil. The method comprises the steps of winding a first conductor wire 23 into a first holder 30 for forming a first sub coil 24, winding a second conductor wire 26 into a second holder 31 for forming a second sub coil 27, attaching the first holder 30 and the second holder 31 to each other such that the first sub coil 24 and the second sub coil 27 together form the coil 22 between the first holder and the second holder.

The method can further comprise holding of the first sub coil 24 in a predetermined winding pattern by means of the first holder 30, and holding of the second sub coil 27 in a predetermined winding pattern by means of the second holder 31. The first holder 30 and the second holder 31 can be positioned on top of each other and be mechanically connected to each other for forming the coil 22 by means of the first sub coil 24 and the second sub coil 27.

It is to be understood that the present invention is not limited to the embodiments described above and illustrated in the drawings; rather, the skilled person will recognize that many changes and modifications may be made within the scope of the appended claims.

The invention claimed is:

1. A device for a wireless power transfer system, the device comprising a housing assembly and a coil assembly arranged inside the housing assembly,
   wherein the coil assembly comprises a first conductor wire forming a first sub coil having a plurality of windings and a second conductor wire separate from the first conductor wire forming a second sub coil having a plurality of windings, wherein a first portion of the first sub coil and a first portion of the second sub coil are arranged in one and the same plane, and
   wherein the housing assembly comprises a first holder in which the first sub coil is held in a predetermined winding pattern, and a second holder in which the second sub coil is held in a predetermined winding pattern, the first holder and the second holder being components of the housing assembly that are secured to each other in an opposing relationship such that the first sub coil and the second sub coil are held relative to one another in their respective predetermined winding patterns to form a predetermined coil assembly configuration in which the coil assembly is located between the first holder and the second holder.

2. The device according to claim 1, wherein the coil assembly has alternating windings of said first portion of the first sub coil and windings of said first portion of the second sub coil in the plane.

3. The device according to claim 1, wherein a second portion of the first sub coil and a second portion of the second sub coil are arranged on top of each other in a direction substantially perpendicular to the plane.

4. The device according to claim 1, wherein a normal vector to the plane is substantially parallel to a main connection direction for connecting the first holder and the second holder to each other, the main connection direction extending from the first holder towards the second holder.

5. The device according to claim 1, wherein the first holder has a first side and a second side opposite to the first side, the first sub coil being arranged at the first side of the first holder, the first side of the first holder having a first surface covering the first sub coil and separating the first sub coil from the second side of the first holder.

6. The device according to claim 1, wherein the second holder has a first side and a second side opposite to the first side, the second sub coil being arranged at the first side of the second holder, the first side of the second holder having a first surface covering the second sub coil and separating the second sub coil from the second side of the second holder.

7. The device according to claim 1, wherein the first holder is plate-shaped and has a main extension in a first plane, and the second holder is plate-shaped and has a main extension in a second plane, the first holder and the second holder being connected to each other such that the first plane and the second plane being arranged substantially in parallel to each other.

8. The device according to claim 1, wherein the first holder has guiding walls for positioning of the first sub coil and separating windings of the first sub coil relative to each other.

9. The device according to claim 1, wherein the second holder has guiding walls for positioning of the second sub coil and separating windings of the second sub coil relative to each other.

10. The device according to claim 5, wherein said first surface of the first side of the first holder has a recess for receiving at least a major portion of the first sub coil.

11. The device according to claim 10, wherein for said major portion of the first sub coil, an outer surface of the first sub coil and the first surface of the first holder are flush with each other when the first sub coil being arranged in the recess.

12. The device according to claim 6, wherein said first surface of the first side of the second holder has a recess for receiving at least a major portion of the second sub coil.

13. The device according to claim 12, wherein for said major portion of the second sub coil, an outer surface of the second sub coil and the first surface of the second holder are flush with each other when the second sub coil being arranged in the recess.

14. The device according to claim 5, wherein the device comprises at least one ferrite plate arranged at the second side of the first holder and the first holder is arranged to insulate the first sub coil and the ferrite plate relative to each other.

15. The device according to claim 14, wherein a second surface of the second side of the first holder has a recess for accommodating said at least one ferrite plate.

16. The device according to claim 5, wherein the first sub coil arranged at the first side of the first holder has two end portions of the first conductor wire which are arranged on the second side of the first holder, the two end portions of the first conductor wire extending from the first side of the first holder via through holes of the first holder to the second side of the first holder.

17. The device according to claim 5, wherein the second sub coil has two end portions of the second conductor wire which are arranged on the second side of the first holder, the two end portions of the second conductor wire extending from the first side of the first holder via through holes of the first holder to the second side of the first holder.

18. A receiver for a wireless power transfer system, wherein the receiver comprises the device according to claim 1.

19. A vehicle comprising the device according to claim 1.

20. A method for producing a device for a wireless power transfer system, the device comprising a housing assembly comprising a first holder and a second holder, and a coil assembly comprising a first sub coil and a second sub coil, wherein a first portion of the first sub coil and a first portion of the second sub coil are arranged in one and the same plane, the method comprising the steps of: winding a first conductor wire into the first holder to form the first sub coil and holding the first sub coil in a predetermined winding pattern by means of the first holder; winding a second conductor wire, separate from the first conductor wire, into the second holder to form the second sub coil and holding the second sub coil in a predetermined winding pattern by means of the second holder; and securing the first holder and the second holder to each other in an opposing relationship such that the first sub coil and the second sub coil are held relative to one another in their respective predetermined winding patterns to form a predetermined coil assembly configuration in which the coil assembly is located between the first holder and the second holder.

* * * * *